United States Patent
Chien

(10) Patent No.: US 9,507,399 B2
(45) Date of Patent: Nov. 29, 2016

(54) ACCELEROMETER-CONTROLLED MASTER POWER SWITCH FOR ELECTRONIC DEVICES

(75) Inventor: Yu-Tsun Chien, Waltham, MA (US)

(73) Assignee: Analog Devices, Inc., Norwood, MA (US)

( * ) Notice: Subject to any disclaimer, the term of this patent is extended or adjusted under 35 U.S.C. 154(b) by 941 days.

(21) Appl. No.: 13/454,607

(22) Filed: Apr. 24, 2012

(65) Prior Publication Data
US 2013/0278081 A1  Oct. 24, 2013

(51) Int. Cl.
*G06F 1/32* (2006.01)

(52) U.S. Cl.
CPC .......... *G06F 1/3206* (2013.01); *Y10T 307/799* (2015.04)

(58) Field of Classification Search
CPC ...... G06F 1/26; G06F 1/3206; G01P 15/135; G01P 1/127; B60R 2/013
USPC ............................ 307/121; 713/323; 340/562
See application file for complete search history.

(56) References Cited

U.S. PATENT DOCUMENTS

| | | | |
|---|---|---|---|
| 6,013,901 A * | 1/2000 | Lavoie ............... | A47G 19/2227 219/432 |
| 6,029,074 A | 2/2000 | Irvin ............................ | 455/571 |
| 6,037,748 A | 3/2000 | Yee et al. ...................... | 320/127 |
| 6,067,044 A | 5/2000 | Whelan et al. .......... | 342/357.07 |
| 6,452,494 B1 * | 9/2002 | Harrison ............... | G06F 1/3203 340/545.4 |
| 7,774,155 B2 * | 8/2010 | Sato ........................ | A63F 13/06 345/156 |
| 8,239,160 B2 | 8/2012 | Lee et al. ...................... | 702/141 |
| 2002/0180462 A1 * | 12/2002 | Hartwell ................ | G01P 15/18 324/662 |
| 2005/0164633 A1 | 7/2005 | Linjama et al. ............. | 455/41.2 |
| 2006/0119508 A1 | 6/2006 | Miller ...................... | 342/357.17 |
| 2006/0148490 A1 | 7/2006 | Bates et al. ................ | 455/456.1 |
| 2006/0174685 A1 | 8/2006 | Skvortsov et al. ........... | 73/1.37 |
| 2007/0268108 A1 | 11/2007 | Weinberg et al. ............ | 340/3.1 |
| 2009/0240463 A1 | 9/2009 | Lee et al. ...................... | 702/141 |
| 2009/0293615 A1 | 12/2009 | Lee ............................ | 73/514.01 |
| 2010/0235667 A1 * | 9/2010 | Mucignat .............. | G06F 1/3203 713/323 |

FOREIGN PATENT DOCUMENTS

EP    2315101    4/2011    ............... G06F 1/32

OTHER PUBLICATIONS

International Searching Authority, International Search Report—International Application No. PCT/US2013/037722, dated Aug. 6, 2013, together with the Written Opinion of the International Searching Authority, 12 pages.

Weinberg, "Minimizing Power Consumption of iMEMS® Accelerometers," Analog Devices, Inc., AN-601 Application Note, 8 pages, 2002.

(Continued)

*Primary Examiner* — Jared Fureman
*Assistant Examiner* — Rafael Pacheco
(74) *Attorney, Agent, or Firm* — Sunstein Kann Murphy & Timbers LLP

(57) ABSTRACT

An accelerometer or other motion sensor is used to provide power to an entire processor system such that the processor does not need to be powered to process the motion signals for initial power-on control. After the processor system is powered on, the processor system may receive and process motion signals as normal, including, for example, performing various power-control functions such as power-down of certain components or the entire system upon detection of a lack of motion for a predetermined amount of time.

24 Claims, 3 Drawing Sheets

(56) References Cited

OTHER PUBLICATIONS

Analog Devices, Inc., "The Five Motion Senses: Using MEMS Inertial Sensing to Transform Applications," Analog.com/inertialsensors, 3 pages, 2009.

Withers & Rogers, LLP, Response to communication pursuant to Article 94(3) EPC dated Dec. 18, 2015—Application No. EP13719215.9, dated Apr. 28, 2016, 12 pages.
European Patent Office, Extended European Search Report—Application No. 13719215.9-1972, dated Dec. 18, 2015, 6 pages.

* cited by examiner

ACCELEROMETER-CONTROLLED MASTER POWER SWITCH FOR ELECTRONIC DEVICES

FIELD OF THE INVENTION

The present invention relates generally to power control in electronic devices, and, more particularly, to accelerometer-controlled power switching for electronic devices.

BACKGROUND OF THE INVENTION

These days, many types of devices (typically but not necessarily battery-powered) include an accelerometer or other inertial sensor (e.g., gyroscope) to perform various motion-based control functions in external devices (e.g., as an input to a video game system) and/or in the handheld device itself (e.g., motion-based orientation of displays, navigation of menus, data entry, etc.). Certain devices include motion-based power control functionality, such as transitioning into a "sleep" mode when the handheld device is stationary for some period of time in order to reduce power consumption or "waking up" upon detection of certain motion. In the "sleep" mode, certain circuitry is disabled or otherwise configured to reduce power consumption, although certain core functionality (such as the processor or portion of the processor needed for processing the accelerometer signals) generally remains powered and running in order to perform the accelerometer-based power control functions.

Generally speaking, the inertial sensor is coupled to a hardware-based processor that is configured to perform power control functions based at least in part on the signals generated by the inertial sensor. The hardware-based processor typically includes and/or controls various types of peripherals, such as a microprocessor core, a wireless transceiver (e.g., cellular, WiFi, etc.), a display (e.g., an LCD screen), various input-output devices, and other types of circuitry, and the processor can selectively manage these peripherals (and sometimes its own circuitry) to manage power consumption. For example, the processor may selectively turn off a display or the backlighting of the display, may turn off the wireless transceiver, may turn off some processor circuitry, etc.

In some devices, the inertial sensor and a related detection module may be powered on while the processor and its peripherals remain powered off, allowing for a limited amount of sensor-based functionality with substantial power savings. For example, United States Published Patent Application Nos. US2009/0240463, US2009/0293615, and US2009/0240462 (each of which is hereby incorporated herein by reference in its entirety) describe devices in which event capturing is triggered by a signal from a MEMS inertial sensor, such as for saving stored data or storing new data upon detection of a predetermined event. Here, the detection module may start to look for activity automatically at designated times, such as when the device is turned on or at periodic intervals thereafter.

SUMMARY OF EXEMPLARY EMBODIMENTS

In one embodiment, an electronic device comprises a power source, an inertial sensor coupled to the power source via a non-switched connection, and a master power switch coupled to the power source and to the inertial sensor, wherein the master power switch is actuated by a predetermined signal from the inertial sensor to turn on the device.

In another embodiment, a master power switch system for an electronic device includes an inertial sensor couplable to a power source via a non-switched connection and a master power switch couplable to the power source and coupled to the inertial sensor, wherein the master power switch is actuated by a predetermined signal from the inertial sensor to turn on the device.

In various alternative embodiments, the inertial sensor may include a MEMS accelerometer, a MEMS gyroscope, or other inertial sensor. The predetermined signal indicates a predetermined motion of the device, such as, for example, movement in a specific direction, movement in a specific pattern, movement with a specific intensity, and/or movement of a specific duration. The inertial sensor may include a circuit to cycle the inertial sensor on and off to provide additional power savings.

In further embodiments, the master power switch may be actuated by a second predetermined signal from the inertial sensor to turn off the device. This second predetermined signal indicates a predetermined motion of the device, such as, for example, movement in a specific direction, movement in a specific pattern, movement with a specific intensity, or movement of a specific duration. The motion used to turn off the device may be the same motion used to turn on the device or may be a different motion.

The device may include a processor system coupled to the master power switch and to the inertial sensor, in which case the processor system may be configured to process signals from the inertial sensor after the device is turned on, for example, to control power to at least one component of the device based on the signals from the inertial sensor.

Additional embodiments may be disclosed and claimed.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

In embodiments of the present invention, an accelerometer, gyroscope, or other motion sensor (referred to generally as an inertial sensor) is used in conjunction with a power switch as a master power switch to turn on the device and, in some embodiments, also to turn off the device. After the device is powered on, thereby providing power to the processor system, the processor system may receive and process signals from the inertial sensor as normal, including, for example, performing various power-control functions such as power-down of certain components or the entire device upon detection of a lack of motion for a predetermined amount of time.

Figure 1:
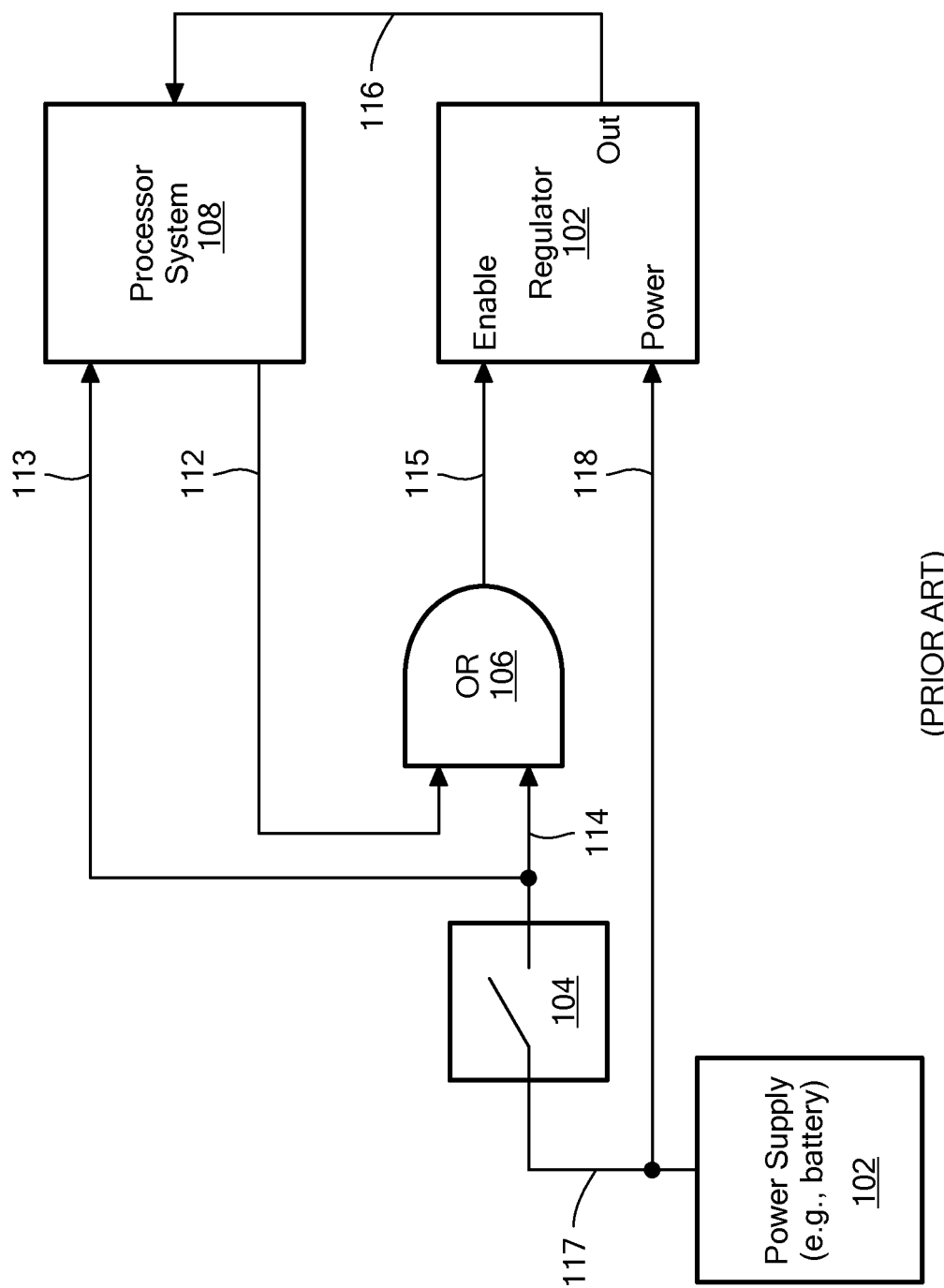
FIG. 1 is a simplified schematic block diagram of power control circuitry as may be found in the prior art.

Various exemplary embodiments are described herein with reference to the power control circuitry shown in FIG. 1, although it should be noted that the power control circuitry shown in FIG. 1 is exemplary and is not meant to represent all power control circuitry to which embodiments of the present invention can be applied. Thus, the present invention is not limited to the power control circuitry shown in FIG. 1 or to any specific power control circuitry.

FIG. 1 is a simplified schematic block diagram of power control circuitry as may be found in the prior art, allowing system power to be turned on using a power switch but thereafter allowing for processor-based management of system power. Among other things, this power control circuitry includes a power supply 102 (e.g., a battery), a power switch 104, an OR gate 106, a processor system 108, and a power regulator 110. Typically, the processor system 108 includes a processor (e.g., a microprocessor) and related components (e.g., memory) and peripherals (e.g., a wireless transceiver, a display, a keyboard, etc.). The power supply 102 is connected to the power switch 104 via connection 117 and to the power regulator 110 via connection 118. When the power switch 104 is operated so as to close the circuit to connection 114, a power-on signal is supplied via the OR gate 106 and connection 115 to the power regulator 110, causing the power regulator 110 to provide power from connection 118 to the processor system 108 via the connection 116. The processor system 108 outputs a signal on connection 112 in order to keep the power regulator 110 on even when the power switch 104 is open. Additional circuitry (not shown) is typically included, e.g., as part of connection 115, to smooth signal-bounce effects caused by operation of the power switch 104 or to effectuate power-on only if the power switch is depressed for a specific amount of time. The power switch 104 may be any of a variety of switches, such as a mechanical switch, and electrical switch, etc.

After the processor system 108 is powered on, the processor system 108 then can control power for the system independently of the power switch 104. For example, the processor system 108 may selectively ignore subsequent transitions of the power switch 104 or may detect when the power switch 104 has been pressed for a predetermined length of time (via connection 113) and cause the system to power off by removing the signal from connection 112 (additional circuitry, not shown, may be included to permit power-off when the power switch is still depressed, as is done in various computer and handheld devices).

Additionally or alternatively, the processor system 108 may turn off power to the entire system or to various components in the processor system 108 upon detecting that the device has not been operated for a predetermined period of time (e.g., no operation of a keyboard, touchscreen, or other controls).

Additionally or alternatively, the processor system 108 may include an inertial sensor and may turn off power to the entire system or turn off or reduce power to various components in the processor system 108 upon detecting a predetermined condition, such as detecting a lack of motion for a predetermined amount of time or detecting a specific "power off" motion. For example, the processor system 108 may turn off or reduce power for peripherals such as a wireless transceiver, a display, or portions of a microprocessor core.

Partial shutdowns may be reversed upon detection of predetermined signals from the inertial sensor, which may indicate either general movement of the device (e.g., virtually any motion) or specific movement of the device (e.g., movement in a specific direction, pattern, intensity, or duration). For such selective power-down and power-up functionality, the processor system 108 typically must be powered on at least sufficiently to process the sensor signals, make the power up/down decision, and perform the appropriate control functionality to effectuate the power control function. Therefore, the inertial sensor generally cannot be used to control power-up of the overall processor system 108, since at least a portion of the processor system 108 must be powered and running.

In exemplary embodiments of the present invention, the inertial sensor is used in conjunction with the power switch as a master power switch to turn on the device. In this way, when the device is powered off, essentially all circuitry other than the inertial sensor may be powered off while still allowing for motion-based power-on of the device.

Figure 2:
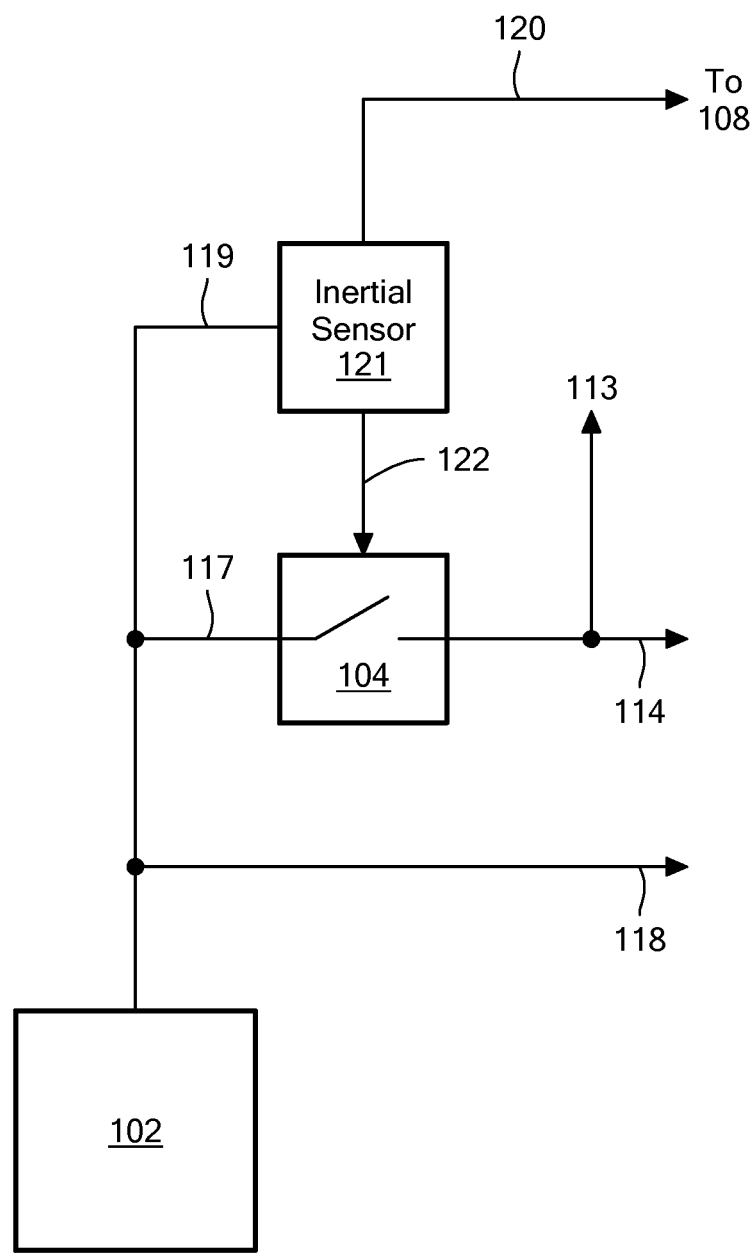
FIG. 2 is a schematic block diagram showing one exemplary embodiment for motion-based device power-on based on the circuitry shown in FIG. 1.

FIG. 2 is a schematic block diagram showing one exemplary embodiment for motion-based device power-on based on the circuitry shown in FIG. 1. Here, the inertial sensor 121 (which may be the inertial sensor from the processor system 108 or may be a separate inertial sensor) is coupled to the power supply 102 via a non-switched connection 119 and is essentially always "on" (although in certain embodiments, the inertial sensor may be cycled on/off in order to provide additional power savings, e.g., using circuitry internal or external to the inertial sensor). The inertial sensor 121 is coupled to the electronic switch 104 via connection 122 and is coupled to the processor system 108 via connection 120 over which it provides sensor signals for traditional processing. The inertial sensor 121 is configured to provide an appropriate output signal on connection 122 for operating the switch 104 when the device is moved in a predetermined fashion. For example, the inertial sensor 121 may be configured to provide the appropriate output signal upon detection of predetermined sensor signals, which may indicate either general movement of the device (e.g., virtually any motion) or specific movement of the device (e.g., movement in a specific direction, pattern, intensity, or duration). Once the switch 104 is operated, the device is powered on and operates as discussed above with reference to FIG. 1, i.e., the processor system 108 is powered on and then may control power for the device.

Embodiments optionally may allow for motion-controlled device power-off via the master power switch, for example, by producing a signal on connection 122 to maintain the power switch 104 in an off position for a sufficient period of time for the processor system 108 to shut off the system, or by connecting the power switch 104 such that the device is shut off upon receipt by the power switch 104 of a predetermined signal from the inertial sensor. Unlike power-off control in which the device is powered off by the processor upon detecting a lack of motion/use for a predetermined time, here, the device is powered off via the power switch upon detecting a specific movement of the device (e.g., movement in a specific direction, pattern, intensity, or duration). The motion used to turn off the device may be the same motion used to turn on the device or may be a different motion.

Thus, in some embodiments, the power switch 104 may control power to the device, e.g., closing the switch 104 turns on the device and opening the switch 104 shuts off the device such that the switch 104 needs to remain closed in order to maintain the device in the powered-on state.

Circuitry may be included in the inertial sensor to perform motion-based device power switching such as discussed herein. For example, the inertial sensor may include a circuit that produces a first predetermined signal to power on the device upon detection of a first motion (e.g., a signal that toggles the switch closed and then opened for an embodiment such as FIG. 2, or in some other embodiments a signal that closes the switch and holds it closed) and that produces a second predetermined signal to power off the device upon detection of a second motion (e.g., a signal that holds the switch closed for an embodiment such as FIG. 2, or in some other embodiments a signal that opens the switch).

In some embodiments, the master power switch 104 is integrated into the inertial sensor, such that the entire unit can be used in the device as a motion-controlled master power switch. Of course, additional functionality may be integrated into such a device, e.g., a power regulator, a microprocessor or microcontroller that is powered on by the built-in acceleration-controlled power switch, etc.

Figure 3:
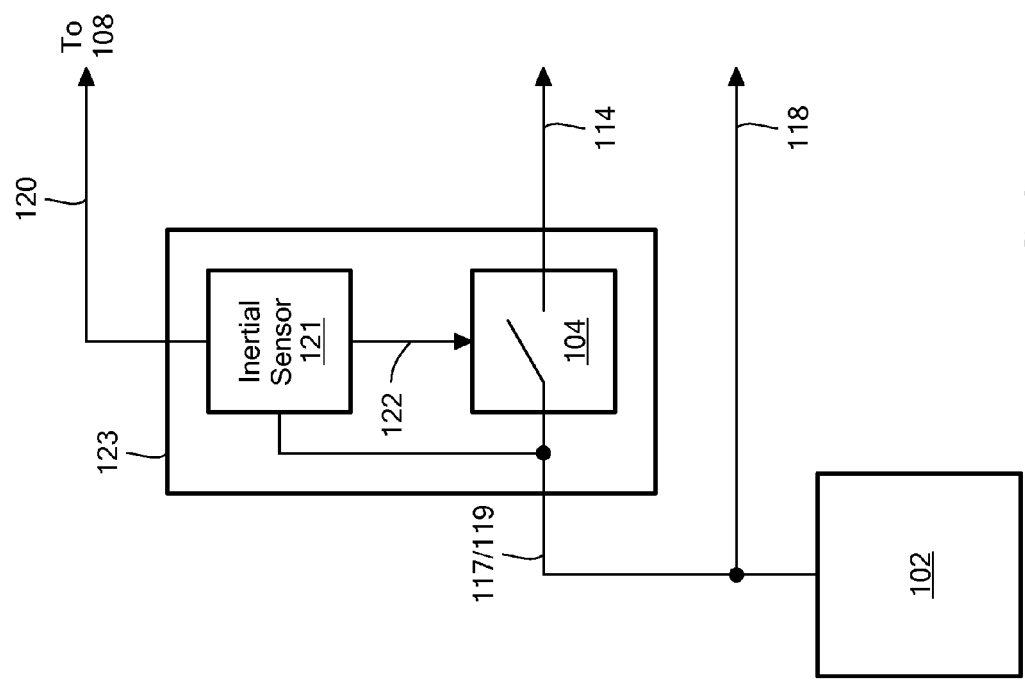
FIG. 3 is a schematic block diagram showing another exemplary embodiment for motion-based device power-on control based on the circuitry shown in FIG. 1.

FIG. 3 is a schematic block diagram showing another exemplary embodiment for motion-based device power-on control based on the circuitry shown in FIG. 1. Here, the switch 104 is integrated into the inertial sensor 123. As with the circuitry in FIG. 2, the inertial sensor 123 is always provided with power via connection 117/119. The inertial sensor 121 is configured to provide an appropriate output signal on connection 122 for operating the switch 104 when the device is moved in a predetermined fashion, for example, as discussed above for reversing a partial shut-down. Once the switch is operated, the device operates as discussed above with reference to FIG. 1, i.e., the processor system 108 can then process sensor signals from connection 120 including motion-based power control.

Figure 4:
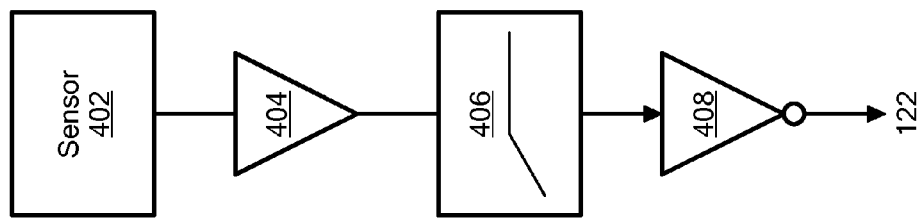
FIG. 4 is a schematic block diagram of relevant components of an inertial sensor in accordance the embodiments of shown in FIG. 2 or FIG. 3.

FIG. 4 is a schematic block diagram of relevant components of inertial sensor 121 for producing the output signal on connection 122, in accordance the embodiments of shown in FIG. 2 or FIG. 3. The inertial sensor 121 includes a sensor 402, such as, for example, sensing fingers that are electrostatically coupled with a movable proof mass. The output of the sensor 402 is amplified by amplifier 404 and then passed through a high-pass filter 406 and NOT gate 408, such that the output signal on connection 122 is triggered (in this case, a transition from high to low) if and when the magnitude of the motion sensor output meets or exceeds a predetermined threshold.

Embodiments of the present invention can include motion-based device power-on functionality in virtually any type of device and for a wide variety of reasons. For example, motion-based device power-on can be used simply to turn on a device or to turn on a device for a specific purpose, e.g., to activate an alarm, to turn on a security camera, etc. Motion-based device power-on can be used to detect virtually any type of movement such as movement caused by a user (e.g., picking up or moving the device), movement caused by natural phenomena (e.g., earthquake or tsunami), movement of a vehicle (e.g., detecting theft/operation of a vehicle), movement caused by a security breach (e.g., detecting the opening/closing of a door or locking/unlocking of a lock), etc. Thus, certain embodiments may include low-G accelerometers (e.g., accelerometers configured to detect acceleration between around 1.2 g to 15 g), while other embodiments may include high-G accelerometers (e.g., accelerometers configured to detect acceleration between around 30 g to 500 g). Embodiments are particularly useful for devices that are powered by battery or other limited energy source, where the potential power savings provided by embodiments of the present invention may allow for increased battery life.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. An electronic device comprising:
a power source;
an inertial sensor coupled to the power source via a non-switched connection; and
a master power switch coupled to the power source and directly coupled to the inertial sensor, wherein the master power switch is actuated by a first predetermined signal from the inertial sensor to turn on the device, and wherein the first predetermined signal indicates a predetermined motion of the device including at least one of movement in a specific direction, movement in a specific pattern, movement with a specific intensity, or movement of a specific duration.

2. An electronic device according to claim 1, wherein the inertial sensor comprises a MEMS accelerometer.

3. An electronic device according to claim 1, further comprising a processor system coupled to the master power switch and to the inertial sensor, wherein the processor system is configured to process signals from the inertial sensor after the device is turned on.

4. An electronic device according to claim 3, wherein the processor system is configured to control power to at least one component of the device based on the signals from the inertial sensor.

5. An electronic device according to claim 1, wherein the inertial sensor includes a circuit to cycle the inertial sensor on and off to provide additional power savings.

6. An electronic device according to claim 1, wherein the master power switch is actuated by a second predetermined signal from the inertial sensor to turn off the device.

7. An electronic device according to claim 6, wherein the second predetermined signal indicates a predetermined motion of the device.

8. An electronic device according to claim 7, wherein the predetermined motion includes at least one of movement in a specific direction, movement in a specific pattern, movement with a specific intensity, or movement of a specific duration.

9. An electronic device according to claim 1, wherein the inertial sensor comprises a MEMS accelerometer and an amplifier.

10. A master power switch system for an electronic device, the master power switch system comprising:
   an inertial sensor couplable to a power source via a non-switched connection; and
   a master power switch couplable to the power source and directly coupled to the inertial sensor, wherein the master power switch is actuated by a first predetermined signal from the inertial sensor to turn on the device, and wherein the first predetermined signal indicates a predetermined motion of the device including at least one of movement in a specific direction, movement in a specific pattern, movement with a specific intensity, or movement of a specific duration.

11. A system according to claim 10, wherein the inertial sensor comprises a MEMS accelerometer.

12. A system according to claim 10, wherein the inertial sensor includes a circuit to cycle the inertial sensor on and off to provide additional power savings.

13. A system according to claim 10, wherein the master power switch is actuated by a second predetermined signal from the inertial sensor to turn off the device.

14. A system according to claim 13, wherein the second predetermined signal indicates a predetermined motion of the device.

15. A system according to claim 14, wherein the predetermined motion includes at least one of movement in a specific direction, movement in a specific pattern, movement with a specific intensity, or movement of a specific duration.

16. A system according to claim 10, wherein the inertial sensor comprises a MEMS accelerometer and an amplifier.

17. An inertial sensor unit for use as a motion-controlled master power switch, the inertial sensor unit comprising:
   an inertial sensor unit housing having a master power input couplable to a power source and a master power output couplable to an external device for providing power to the external device;
   an inertial sensor disposed within the inertial sensor unit housing and having (a) a sensor power input coupled to the master power input and (b) a sensor output; and
   an on/off master power switch disposed within the inertial sensor unit housing and having (a) a switch power input coupled to the master power input, (b) a switch power output coupled to the master power output, and (c) a switch control input directly coupled to the sensor output of the inertial sensor, wherein the master power switch is configured to be actuated by a first predetermined sensor output signal from the inertial sensor to selectively provide electrical power from the switch power input to the switch power output.

18. An inertial sensor unit according to claim 17, wherein the first predetermined sensor output signal indicates a predetermined motion including at least one of movement in a specific direction, movement in a specific pattern, movement with a specific intensity, or movement of a specific duration.

19. An inertial sensor unit according to claim 17, wherein the inertial sensor comprises a MEMS accelerometer.

20. An inertial sensor unit according to claim 17, wherein the inertial sensor includes a circuit to cycle the inertial sensor on and off to provide additional power savings.

21. An inertial sensor unit according to claim 17, wherein the master power switch is configured to be actuated by a second predetermined sensor output signal from the inertial sensor to selectively decouple the switch power output from the switch power input.

22. An inertial sensor unit according to claim 21, wherein the second predetermined sensor output signal indicates a predetermined motion including at least one of movement in a specific direction, movement in a specific pattern, movement with a specific intensity, or movement of a specific duration.

23. An inertial sensor unit according to claim 17, wherein the inertial sensor unit housing further comprises a master sensor output coupled to the inertial sensor for outputting inertial sensor signals.

24. An inertial sensor unit according to claim 17, wherein the inertial sensor comprises a MEMS accelerometer and an amplifier.

* * * * *